United States Patent Office 3,705,123
Patented Dec. 5, 1972

3,705,123
POLYPHASE COMPOSITIONS
Bert H. Mahlman, West Chester, Pa., and Harold M. Spurlin, Wilmington, Del., assignors to Hercules Incorporated, Wilmington, Del.
Continuation-in-part of application Ser. No. 670,112, Sept. 25, 1967, which is a continuation-in-part of abandoned application Ser. No. 606,449, Dec. 30, 1966. This application Oct. 29, 1970, Ser. No. 85,189
Int. Cl. C08f 45/52
U.S. Cl. 260—28.5 A
8 Claims

ABSTRACT OF THE DISCLOSURE

Polyphase compositions are described wherein a propylene polymer in crystalline but non-spherulitic form is a continuous network as one phase and the second phase contains at least 50% of a hydrocarbon wax. Polypropylene-paraffin wax is typical. They have a high degree of ductility, toughness and elongato-ability and films thereof are capable of orientation. Also describes preparation of colloidal dispersions of the propylene polymer in hydrocarbon wax useful for making such compositions and the process of preparing the polyphase compositions.

---

This application is a continuation-in-part of our copending U.S. application Ser. No. 670,112, filed Sept. 25, 1967 and now abandoned, which in turn was a continuation-in-part of U.S. application, Ser. No. 606,449, filed Dec. 30, 1966 and now abandoned.

This invention relates to solid polyphase compositions such as paraffin wax and other crystalline materials modified with high molecular weight isotactic polypropylene or propylene copolymers.

Paraffin wax is a well-known material which has been widely used as a vapor barrier and moisture-proof coating for paper, films, boxes, and other materials. However, such wax compositions are of limited utility, particularly in film applications, because of their brittleness even at ordinary temperatures, lack of adherence to most substrates, low melting point, etc. To overcome these deficiencies, it has been customary to blend the paraffin wax with various polymers and resins, but the use of such blends is limited in scope for one or more reasons. Many of the polymers so used are polar in nature and have undesirable effects on the vapor and liquid permeabilities of the blend. Others are incompatible or, if compatible, raise the viscosity of the molten blend to a degree that makes handling of the blend virtually impossible for most applications. Consequently, blends that are available, are applied as very viscous solutions at elevated temperatures, which solutions are not only difficult to handle, but are subject to decomposition during the holding period at the high temperature required for such application.

Many attempts have been made to incorporate polyolefins in wax to take advantage of their excellent physical properties. However, it has previously been possible to incorporate only amorphous or very low molecular weight polyolefins and even so, only low concentrations of such polyolefins. When attempts were made to incorporate the higher molecular weight crystallizable polymers and high concentrations thereof, the lack of compatibility of such polymers with the wax and consequent instability of the blend, together with the tremendous increase in viscosity of the melt, made application of such blends completely impractical.

Now in accordance with this invention it has been discovered that paraffin waxes can be modified with isotactic polypropylene copolymers to form solid polyphase composition which are new compositions of matter having properties not previously achieved by blending these waxes with polyolefins. The new solid polyphase compositions of this invention comprise:

(a) as a continuous phase a crystallizable propylene polymer being present as a substantially continuous network in the crystalline but essentially non-spherulitic state, and preferably in the smectic state, and having an intrinsic viscosity of at least about 7.5, (b) as a second phase a hydrocarbon wax, said propylene polymer containing at least about 75 mole percent of propylene, and comprising about 5 to 20% of the total composition.

The new solid polyphase compositions of this invention wherein a propylene polymer is present as a continuous network with the wax phase uniformly distributed throughout, are unique materials having properties which enable their use in many applications not previously possible for blends of these materials. These new polyphase compositions have an unexpected degree of ductility and toughness. Another, and even more unexpected, property of these polyphase compositions is their ability to be oriented. One of the most useful and unique properties of high molecular weight crystalline polymers is that they are "orientable." An "orientable" polymer is one which shows substantially improved strength and modulus after it has been stretched, in general, in either one or two dimensions to give "uniaxial" or "biaxial" orientation. Isotactic polypropylene is such a polymer. On the other hand, wax is not orientable. It was, therefore, most surprising to find that polyphase compositions comprising polypropylene and, for example, paraffin wax, even though they contain major mounts of wax, can be formed into films which have outstanding elongato-ability and which can be uniaxially and biaxially oriented to yield high strength films.

The first phase of the polyphase compositions of this invention comprises the crystallizable propylene polymer present as a substantially continuous network of the polymer, preferably in the smectic state, which smectic state can be described as an extended disperse crystalline structure which is essentially non-spherulitic. It is well recognized that the division of polymer structure into crystalline and amorphous phases is an over simplification, and more likely there exists a gradation in structural organization between these extremes. Yet in practice, the degree-of-crystallinity parameter is a useful concept in correlation of structure with physical properties. In the specific case of polypropylene structure, three unique levels of order are readily differentiated by standard X-ray diffraction methods. The amorphous state is characterized by a single broad diffraction maximum at $17.0°2\theta$ diffraction angle. The crystalline state is characterized by multiple well-defined maxima. Those of the alpha or monoclinic form occur at 14.0, 16.8, 18.5, and $21.8°2\theta$. Those of the beta or hexagonal form occur at 15.0 and $21.3°2\theta$. The third state represents a condition of intermediate order called variously, the "para-crystalline" or "smectic" state which is characterized by two quite broad rather than sharp diffraction maxima at 15 and $21°2\theta$. This quasi-crystalline state, here called the smectic state, has short range order which differentiates it from the amorphous state but lacks the long range order associated with true crystals.

Polypropylene can exist in several polymorphic crystalline forms as is shown by their unique X-ray diffraction spectra discussed above. These forms are also readily observable under the polarizing microscope as spherical arrays of dendritic crystallites. Electron microscopy has recently revealed these dendrites to be regularly folded chain crystals having a fold period of a few hundred angstroms. The dendrites emanate from the nucleus, growing by noncrystallographic branching until their growth is constrained by impingement with dendrites from neighboring spherulites. These spherulitic structures fill the free volume. But since the observed (as opposed to the theoretical) degree of crystallinity as measured by density or X-ray is seldom more than 75 percent, appreciable uncrystallized polymer chains which are rejected during crystallization are segregated within and to a lesser extent between spherulites. The spherulite is, then, a two-phase structure with extensive folded-chain crystalline regions and amorphous regions as shown by heavy metal electron staining.

In contrast to the spherulitic crystalline state, the polypropylene which, in the polyphase compositions of this invention, is in the smectic state exhibits only a fine fibrous structure by electron microscopy. Unless the preponderance of the propylene polymer is in this fine fibrous non-spherulitic form, the polyphase composition is brittle and lacks the elongato-ability and orientability characteristic of the instant polyphase compositions. Reference herein to crystallization of the propylene polymer, when the polyphase compositions are formed, is to precipitation or crystallization of the propylene polymer to the smectic state.

In many instances, depending on the characteristics of the wax, storage conditions, and the like, the propylene polymer, which is in the smectic form in the composition, may on aging slowly convert to the monoclinic crystalline form. The higher the temperature to which the composition is exposed, the more rapid is this conversion. In such cases the monoclinic polymer that is formed will be non-spherulitic and will still be in the extended form. Thus, the propylene polymer in the polyphase compositions of this invention will be seen to be present in an essentially wholly smectic state, as a mixture of the smectic and monoclinic states, or as an essentially wholly monoclinic state. Generally, it is preferred that the propylene polymer be largely in the smectic state.

The method by which this smectic state is achieved will be discussed in greater detail below. Briefly, it comprises the formation of a homogeneous melt of the first and second phase materials, which when cast into a film, or otherwise formed, is very rapidly cooled whereby the smectic state is formed. It is believed that when the homogeneous melt is rapidly cooled, there is crystallization of the second phase, i.e., the wax, before the polypropylene can completely crystallize and/or before separation into two liquid phases can occur, and spherulite formation is thus prevented. Many factors enter into this phenomenon of producing the smectic state such as concentration of the propylene polymer, molecular weight of the polymer and quench rate.

All of the simple tensile properties of these compositions are affected in a parallel fashion by changes in these various parameters over most of the range. For example, in general in increase in polymer molecular weight, concentration, or in quench rate results in an increase in strength, modulus, abrasion resistance, impact strength, and elongation of the polyphase composition. This parallelism is in sharp contrast to the normal experience in polymer fabrication; normally an increase in elongation is obtainable only at the sacrific of a loss in abrasion resistance, or an increase in modulus is attained by a sacrifice in impact strength. However, in the present case an increase in any of the critical parameters leads to an increase in all the properties. Because all of the simple physical properties parallel each other, elongation of the product is used to demonstrate the improved properties of the composition. Any of several other tensile properties could be used equally well to demonstrate the improvement in properties.

Figure 1:
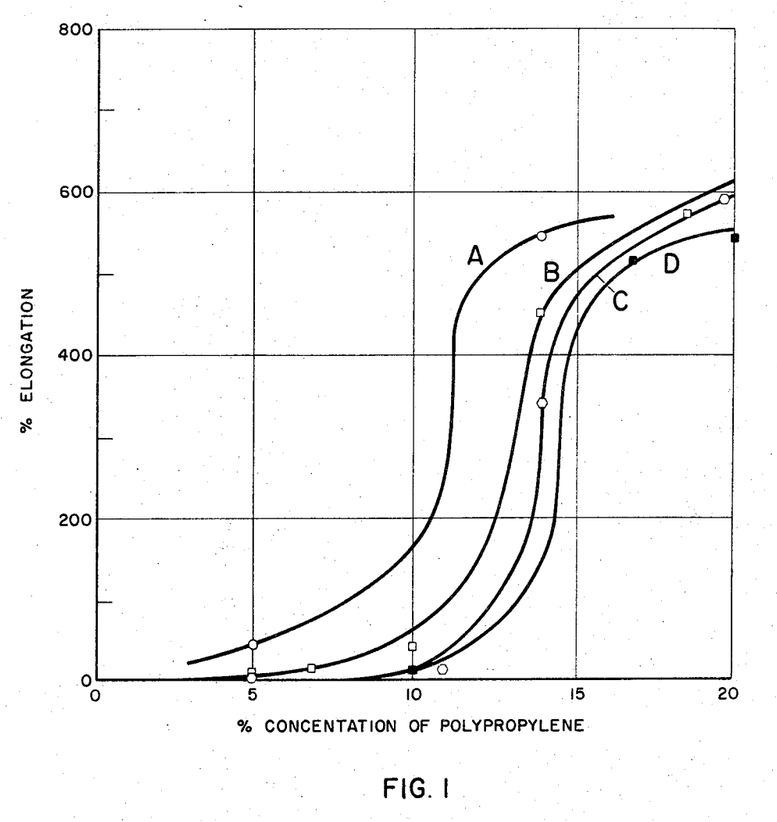

As already stated, any crystallizable propylene homopolymer or copolymer having an intrinsic viscosity of at least about 7.5 can be used to produce the polyphase compositions of this invention containing the specified wax concentration. The amount of the propylene polymer which is necessary to achieve the polyphase compositions of this invention will depend upon the molecular weight of the polymer as well as the properties desired in the polyphase composition. Thus, the higher the molecular weight of the polymer, the less of it that is required to produce a polyphase composition having the continuous network of essentially non-spherulitic polymer with a given degree of ductility. On the other hand, with the lower molecular weight polymers, a higher concentration of the polymer must be used to obtain the same degree of ductility. The effect of the molecular weight, expressed herein in terms of intrinsic viscosity (I.V.), on the elongato-ability, at a given concentration, is demonstrated in FIG. 1 wherein the polyphase composition comprises isotactic polypropylene as the first phase and paraffin wax as the second phase. The paraffin wax used in these particular polyphase compositions was a fully refined paraffin hydrocarbon wax having a melting point of 68° C. In FIG. 1 are graphs showing the percent elongation of the polyphase composition versus the concentration of the polypropylene in the composition for different molecular weight polypropylenes. Curves A, B, C, and D are such graphs wherein the polypropylene has an intrinsic viscosity of 12.2, 11, 8.1, and 7.5 respectively. The elongation of the wax itself is less than 1%. As can be seen from FIG. 1, the concentration of polypropylene necessary to form a structure having greater than 30% elongation varies from 5% for extremely high molecular weight polypropylene (I.V., 12.2) to 8.5% for I.V. 11, to 10% for I.V. 8.1 and to 12% for I.V. 7.5.

The propylene polymer will comprise at least about 5% and preferably at least about 10% and not more than about 20% of the total polyphase compositions. At concentrations below about 5% even with the highest molecular weight polymer and the fastest practical quench rate, the properties of ductility and toughness are essentially lost and the composition exhibits the brittleness of the second phase material, i.e., the brittleness of wax; furthermore, such compositions cannot be oriented.

The propylene polymer can be any isotactic polypropylene or a crystallizable copolymer of propylene with up to 25 weight percent of a second olefin having 2 to 20 carbon atoms. The second olefins are, inter alia, ethylene, butene-1, pentene - 1, 3 - methylbutene - 1, 4 - methylpentene-1, hexene-1, octene-1, decene-1, dodecene-1, tetradecene-1, hexadecene-1, octadecene-1, eicosene-1, styrene and substituted styrenes such as the halo- and alkyl-substituted styrenes like p-chlorostyrene and p-methylstyrene. The copolymers include both random copolymers and end-block type copolymers. The latter type is usually characterized by retaining its crystallinity at higher concentrations of the second olefin. Thus, crystallizable propylene copolymers with ethylene as the comonomer up to 25 weight percent of the polymer can be used. When the second olefin is a long chain olefin, this upper limit will be considerably less, usually not more than about 10 to 12 weight percent for the polymer to be crystallizable. With the random type copolymer, about 8 weight percent, and preferably 6 weight percent, is the upper concentration of the second olefin.

Exemplary of the hydrocarbon waxes which can be used to form the second phase of the polyphase compositions are, for example, petroleum waxes such as paraffin wax, slack wax, scale wax, and microcrystalline wax, and synthetic waxes such as the Fischer-Tropsch waxes. Useful waxes are those having an AMP of about 50 to 105° C. and preferably about 65 to 80° C.

The second phase can contain, in addition to the hydrocarbon wax, other materials as modifiers therefor such as resins, as for example, rosin, rosin esters, hydrogenated rosin esters, terpene resins, petroleum resins, hydrocarbon resins, coumaroneindene resins, low molecular weight styrene resins, oils, etc., provided that at least 50% of the total second phase is hydrocarbon wax.

The compositions of this invention can also contain, in addition to the propylene polymer phase and the above described wax phase, additional materials as will occur when inert fillers, pigments, etc. are incorporated. Any of the usual additives can likewise be incorporated, as for example, heat and light stabilizers, antioxidants, plasticizers, pigments, dyestuffs, fillers, nucleating agents, antiblocking agents, lubricants, flameproofing agents, etc.

The solid polyphase compositions of this invention are prepared by forming a homogeneous melt of the polymer and wax, whether or not any additive materials are homogeneous therewith, and then cooling the melt at such a rate that spherulite formation of the propylene polymer is prevented and there is formed the extended disperse crystalline structure which is essentially nonspherulitic. The requisite rate of cooling to bring this about will depend on the particular wax involved, the temperature of the melt just prior to quenching, and the molecular weight of the propylene polymer. Thus, in the case of polypropylene-paraffin wax compositions, the higher the temperature to which the polypropylene-wax solution has been subjected, the lower will be the necessary crystallization temperature of the polypropylene to get good elongation. The higher the molecular weight of the polypropylene, the lower the sensitivity to the cooling rate. In general, polypropylene-paraffin wax solutions must be cooled at a rate greater than 95° C. per minute. Higher quench rates can, of course, be utilized. If instead of subjecting the melt to such a quench, the solution is slowly cooled, the polypropylene forms spherulites and the resultant composition lacks ductility and toughness and is brittle.

As previously pointed out, the first and second phase materials must form a homogenous melt. Otherwise a discontinuous propylene polymer structure is produced which then lacks the property of ductility. It is, of course, possible to have a third material, which may or may not form a homogeneous melt with the first and second phase materials, as for example, when a filler and/or pigment is present. These have essentially no disadvantageous effect on the crystallization of the polypropylene in nonspherulitic form and hence do not prevent the formation of the desired polyphase composition.

Any desired means can be utilized for mixing the polymer and wax phases, either prior to or during the heating of the mixture to the molten state. It is usually necessary, however, to use polymers having a particle size of 1 micron or less. In fact, it has previously not been possible to blend such high molecular weight polymers with wax and other crystalline materials because of the high fusion temperatures and length of the fusion cycle required. Colloidal dispersions of submicron isotactic polypropylene and propylene copolymers have recently been discovered which are uniquely adapted for the preparation of the solid polyphase compositions of this invention.

These colloidal dispersions are stable dispersions of finely divided isotactic or crystallizable polypropylene and copolymers of propylene having up to about 25 weight percent of one or more other α-olefins containing 2 to 20 carbon atoms, in liquid, organic, non-solvent diluents. Characteristic of these dispersions is the fact that the primary particles of the propylene polymer have in their maximum dimension an average size in the range of 0.02 to 0.5 micron, i.e., in the colloidal range, and while clusters of these primary particles are present, some of which may fall outside the range of colloidal particle size, the dispersion is essentially free of clusters of the primary particles greater than 5 microns in size. Because of their predominately colloidal particle size and the fact that the dispersions exhibit a very high degree of Brownian motion, these dispersions are best described as being colloidal dispersions. Another criterion of the colloidal dispersions is that the propylene polymer is over 80% crystallizable and the crystallizable fraction has a crystallinity of 45 to 62%. Another characteristic of these dispersions is their stability, since they are capable of standing even at high solids content with appreciably no settling and if any slight settling does occur, the particles can be quickly redispersed by simply shaking the container by hand.

These colloidal dispersions of polypropylene are prepared by polymerizing propylene or copolymerizing propylene with a second α-olefin in the presence of a colloidal dispersion of a trivalent titanium containing catalyst. It is well known that an α-olefin such as propylene can be polymerized with the aid of catalysts containing organometallic compounds in combination with transition metal compounds. Particularly effective catalysts for this purpose are combinations of alkylaluminum compounds and titanium compounds. When preparing the colloidal dispersions of crystalline propylene polymers, it is necessary first to prepare a colloidal trivalent titanium containing catalyst and then use this catalyst in combination with an aluminum alkyl compound to polymerize the propylene and obtain the colloidal dispersion. Any titanium trichloride can be used for the preparation of the colloidal catalyst provided that it contains, if any, only a minor amount of the beta form of the titanium trichloride. A particularly active titanium trichloride-containing catalyst is obtained by reducing titanium tetrachloride at low temperature with an aluminum alkyl such as an alkylaluminum sesquichloride and then heat treating the precipitate so obtained. A colloidal dispersion of the trivalent titanium catalyst is then prepared by suspending it in any convenient inert hydrocarbon diluent, as for example, n-heptane, kerosene, etc. To this suspension is then added a dialkylaluminum halide such as diethylaluminum chloride or diisobutylaluminum chloride, in a molar ratio of from about 0.1 to about 4.0 aluminum per titanium. Other catalyst components can be used in conjunction with the titanium and aluminum components such as Lewis bases, as for example, anisole. There is then added from 3 to 40 moles per mole of titanium of a straight chain α-olefin containing at least 6 carbon atoms. Exemplary of the α-olefins that may be used for this purpose are: n-hexene-1, n-octene-1, decene-1, undecene-1, dodecene-1, and hexadecene-1. The polymerization of this long chain α-olefin is generally carried out at moderate temperatures, as for example, from about 30° C. to about 70° C. There is obtained by this process a colloidal suspension of the trivalent titanium-containing catalyst. This colloidal suspension can be used at once or stored until desired.

The propylene polymerization process is carried out by adding to a suitable liquid organic diluent, as for example, a saturated aliphatic, cycloaliphatic, or aromatic hydrocarbon, an aluminum alkyl activator such as diethylaluminum chloride or ethylaluminum chloride alkoxide, in an amount of from about 5 to 10 millimoles per liter of diluent. Exemplary of the diluents that can be used are: hexane, heptane, octane, decane, cyclohexane, benzene, toluene, xylene, and mixtures of such hydrocarbons, as for example, high and low boiling kerosene and other such petroleum fractions, chlorinated aromatic hydrocarbons, highly hindered aliphatic ethers, sulfides, etc., such as di-t-butyl ether, aromatic ethers such as diphenyl ether and other inert liquid organic diluents and liquid propylene itself. The colloidal dispersion of trivalent titanium catalyst is then added and the propylene is introduced at a very slow rate so as to gradually increase the pressure to 75 p.s.i.g. or higher, which pressure is maintained until the polymerization is complete. Hydrogen can be added if desired to produce a lower molecular weight polymer. The polymerization is generally carried out at a temperature of from about 30° C. to about 80° C. The length of time the polymerization is carried out will be dependent upon the solids content desired or until the viscosity of the reaction mixture becomes too great for easy agitation. The polymerization is stopped by adding a small amount, as for example, 2 volume percent based on the original volume of diluent, of an alcohol such as n-butanol. The catalyst residues are removed by any of the usual means utilized in the purification of polyolefins, such as for example, an acid, water or basic wash, treatment with an ion exchange resin or any other convenient means.

When it is desired to produce a copolymer of propylene with a second gaseous olefin, the same procedure is followed except that the monomer gas is a mixture of propylene and the second olefin or olefins in the ratio required to yield the correct ratio in the final products. This ratio depends upon the relative polymerization ratio of the olefins and is readily calculated by those skilled in the polyolefin art.

If the second olefin is a liquid, the total amount of such olefin to be used can be dissolved in the reaction diluent prior to the addition of any propylene gas or it can be used as the diluent. Alternatively, the second olefin can be added continuously throughout the reaction time period as is done with gaseous olefins. In either case, the ratio of the monomers depends upon the desired final ratio and on the polymerization reactivity of the second olefin relative to propylene.

The colloidal dispersions of the propylene polymers can be used directly in the preparation of the polyphase compositions by adding the wax component to the dispersion, or vice versa, then removing the diluent, and heating to form the homogeneous melt which is then quenched to produce the polyphase composition. The colloidal dispersion of crystallizable propylene polymer in the wax can also be prepared by dispersing in the molten wax, a solid solvent-free, colloidally dispersible propylene polymer obtained by drying the above-described colloidal dispersions in liquid organic diluents. Removal of the diluent from the colloidal dispersions can be effected by any of the known methods such as spray-drying, vacuum stripping, drum drying, and the like, the diluent removal being carried out at a temperature below the softening temperature of the polymer particles in that diluent, and preferably below about 100° C.

Surprisingly, it has been found that instead of separately preparing the colloidal dispersion and then blending it with the wax, when wax is the second phase material, the colloidal propylene polymer can be prepared directly in the wax by utilizing the wax as the diluent, and carrying out the polymerization as described above, but at a temperature above the melting point of the wax. By so carrying out the polymerization in situ in the wax, the same particle sizes are achieved as in the above-described procedure.

The method by which the polymer and wax components are heated together to produce the requisite homogeneous melt, which is then rapidly cooled, will depend on the use of the polyphase composition. For coatings applications, as for example, coating of paper, carton board, and the like, with paraffin wax-polypropylene polyphase compositions, it is generally preferable to coat with a blend of the colloidal polypropylene dispersed in the molten wax component, then heat the coated substrate to the temperature required to fuse the composition and form the homogeneous melt and quench via a cold air blast, chill roll, water or ice bath, etc. Similarly, potting or slush molding is most conveniently done with dispersions in molten wax, which are subsequently fused and quenched. Where films or other extruded forms are to be produced, the components can be fed directly to the extruder, or a blend of them fed to the extruder, where they are heated to the fusion temperature and then are passed through a quench immediately after extrusion into the desired form.

Figure 2:
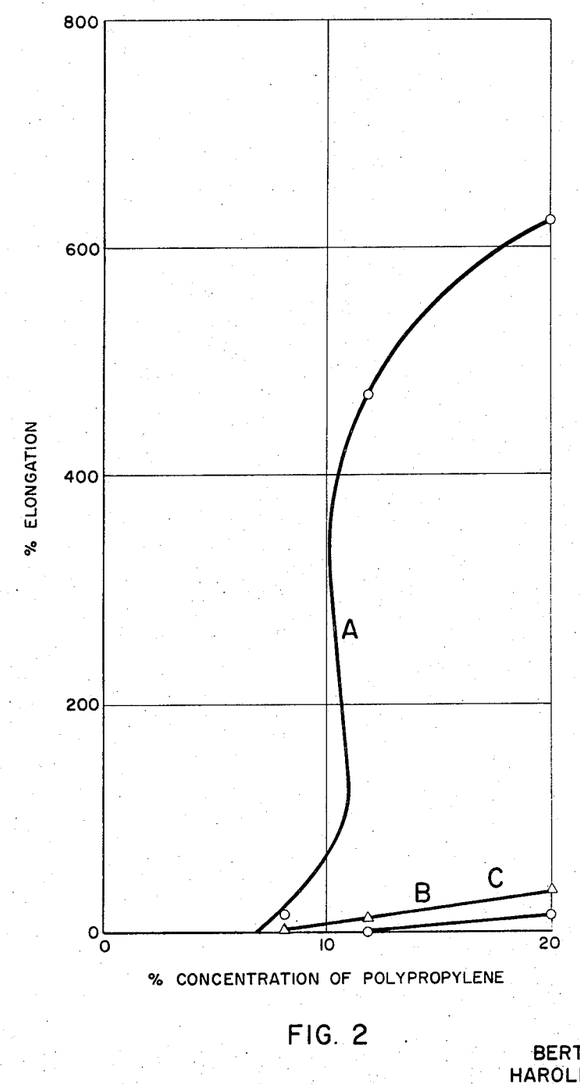

The fusion temperature, time and quench rate to be employed in producing the polyphase compositions of this invention will depend on such factors as the propylene polymer used, its molecular weight, particle size, and the concentration thereof in the total composition, as well as the nature of the second phase material and its melting point, and to at least some extent on the end use of the composition. The minimum fusion temperature is a function of the solvating effect of the wax on the propylene polymer, i.e., the depression of the melting point of the propylene polymer by the wax, and is also a function of the molar volume of the wax. For example, in the case of propylene-paraffin wax polyphase compositions, the minimum fusion temperature will be about 110° C. and in general, a fusion temperature of from about 100° C. to about 250° C. will be used, although higher temperatures with shorter fusion times can be used. Extremely critical to the production of the polyphase compositions is the need to rapidly cool the molten solution to produce the continuous fibrous network of non-spherulitic polypropylene characteristic of these polyphase compositions. It has been found that for most uses, this quench rate must be greater than about 95° C. per minute, but again the actual quench rate depends on such factors as the temperature of the melt prior to quenching, the thickness of the film or other shape being quenched, etc. In general, the higher the quench rate the better the physical properties of the polyphase composition. This is illustrated by FIG. 2 where polypropylene-paraffin wax polyphase compositions of varying concentration of polypropylene were cooled at different rates. The polypropylene used had an intrinsic viscosity of 8.1 and the paraffin wax was a household wax having a melting point of 50° C. Curve A is the plot obtained when a quench rate of 250° C./min. was used; Curve B is the plot obtained when a quench rate of 110° C./min. was used; and Curve C is the plot obtained when the films were simply allowed to cool in air, i.e., at a cooling rate of less than 50° C./min.

Figure 3:
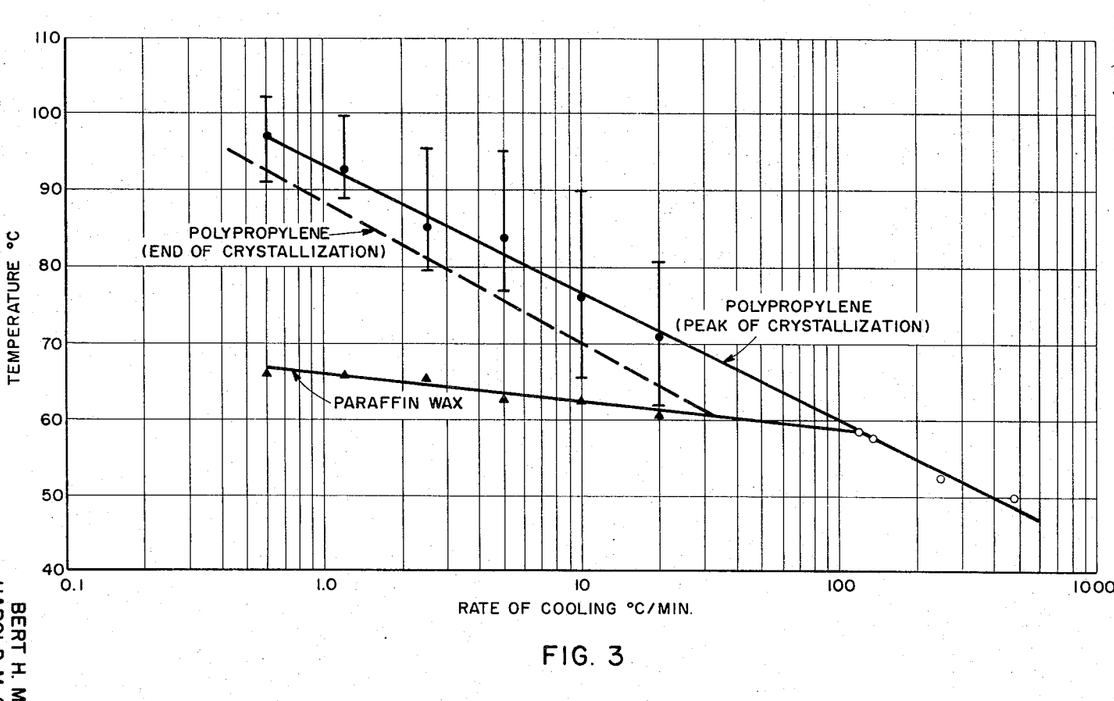

As has already been pointed out, it is essential that spherulitic crystallization of the polypropylene be prevented. In the case of the polypropylene-paraffin wax compositions, the second phase must crystallize concurrently with or prior to the crystallization of the polypropylene to the smectic state. FIG. 3 shows the effect of the cooling rate on polypropylene and paraffin wax crystallization in a blend of the two. The blend used contained 13.8% of a polypropylene having an intrinsic viscosity of 10 and 86.2% of a refined paraffin wax having a melting point of 68° C. The crystallization temperatures of the two ingredients for cooling rates from 0.625 to 20° C./min. were determined on a Perkin Elmer Differential Scanning Calorimeter, raising the temperature of the sample at 20° C./min. from 40° C. to 190° C., held at that temperature one minute, and then programmed down linearly at the rates indicated. The vertical lines at each point on the polypropylene curve show the temperature at which the polypropylene began to crystallize and ended, the upper solid line showing the peak of crystallization and the lower dotted line showing the end of the polypropylene crystallization. For cooling rates above 20° C./min., a 15-mil film of the same blend was fused at 200° C. between a 25-mil chrome-plated brass plate and a 2-mil aluminum foil sheet, and then quenched into baths of 50° C., 25° C., 17° C., 5° C., and −35° C. The actual sample temperature was recorded with a thermocouple embedded in the polypropylene-wax composite. It is readily apparent that at slow cooling rates up to 30–35° C./min. the polypropylene crystallizes first and then the wax. At higher rates, the wax crystallizes concurrently with the polypropylene until a rate of about 95° C./min. the majority of the polypropylene which can crystallize does so with the majority of the wax. At rates above about 110° C./min., the tendency is for the wax to crystallize before the polypropylene. Examination of the composites so obtained showed that those that were quenched at rates greater than 95° C./min. had the elongato-ability and orientability characteristic of the polyphase compositions of this invention, whereas those cooled at slower rates did not exhibit these properties.

The polyphase compositions of this invention have many applications. Thus, the propylene polymer-paraffin wax composites can be used for any of the usual applications of paraffin wax such as barrier coatings as in wax paper, milk carton board, etc., which also improve the mechanical strength of the paper. They can also be used for the production of tough, extensible films useful as household wrap, bread wrap, etc. for the preparation of reinforced sheets by the impregnation of non-woven fiber masses with the flexibilized wax, in hot-melt adhesives, and as molding and potting compounds. The polymer-wax compositions of this invention can be used as hot-melt coatings and adhesives, as carpet backing, for the preparation of case hardened structures where the exterior surfaces are tough and orientable and the inside is weak, friable and coarse grained, which structures are useful for insulation and the like. They are particularly useful for the preparation of films and fibers which can be oriented. Thus, for example, striated films can be prepared from these polyphase compositions, which on fibrillation produce ribbons or filaments, useful in binder twine, and the like. Many other uses for the polyphase compositions of this invention will be apparent to those skilled in the art.

As pointed out above, there are three general methods of preparing the wax-propylene polymer polyphase compositions of this invention from colloidal propylene polymers. One is to prepare the colloidal dispersion of crystallizable propylene polymer in a liquid organic diluent as a separate step and then add this dispersion to the wax, or vice versa, and remove the diluent. A second method is to dry the colloidal dispersion and then disperse the dried product in the molten wax and the third method is to prepare the colloidal propylene polymer in situ in the wax. Typical preparations of the colloidal dispersions of crystallizable propylene polymers in a normally liquid, non-solvent, organic diluent as used in the first two of these methods and their preparation in situ in paraffin wax are described in Examples 1–3 below.

EXAMPLE 1

Preparation of colloidal dispersion of polypropylene

To a nitrogen filled reaction vessel, equipped with a magnetic stirring bar, was added 825 milimoles of isobutylaluminum sesquichloride as a 25% solution in kerosene (boiling range of 165°–200° C.). With the temperature adjusted to 12–15° C., there was added to the stirred solution, in one addition, 400 millimoles of titanium tetrachloride. The mixture was stirred for 16 hours, then with stirring was heated to 110° C. for 4 hours, then to 120°–130° C. for 10 hours, and then was allowed to cool. The reaction slurry was transferred under nitrogen to a centrifuge, the supernatant was discarded and the titanium trichloride was washed under nitrogen three times with n-heptane by agitation and centrifugation each time. It was then brought back to its original volume with n-heptane.

A nitrogen filled reaction vessel was charged with 100 ml. of dry air-free n-heptane, 0.5 millimole of diethylaluminum chloride, and 2.5 millimoles of the above prepared titanium trichloride. The vessel and contents were heated to 52°–54° C. and, in one addition, 36.6 millimoles of octene-1 was added. The mixture was held at 52°–54° C. for one hour. A 5 cc. sample of the reaction mixture, which appeared to be a sparkling, clear red solution, was removed for analysis, which showed that 88% of the octene had been consumed.

To a reaction vessel containing 900 ml. of n-heptane, under nitrogen and at 50° C., was added 10 millimoles of diethylaluminum chloride and 120 ml. of oxygen was added and allowed to react for 15 minutes. The unreacted oxygen was then removed by sparging with nitrogen. The above prepared colloidal dispersion of titanium catalyst was pressured into the reactor under nitrogen. The pressure was then vented to an atmospheric pressure of nitrogen. Propylene was then admitted to the reactor to sparge out the nitrogen and to slowly increase the pressure to 50 p.s.i.g. and this pressure was maintained until the end of the run. The propylene was added for a total time of 230 minutes, after which 20 ml. of n-butanol was added and the mixture was stirred for 16 hours at 50° C. The total polymer reaction mixture was then pressured into a flask containing 500 ml. of 5% aqueous hydrogen chloride under nitrogen. After stirring for 2 hours at room temperature, the product was washed neutral with water and then was centrifuged to remove suspended water.

The colloidal polypropylene dispersion so obtained contained 29.7% by weight of polymer, based on the weight of the dispersion, and the polymer had an intrinsic viscosity of 9.0. Precipitation of a portion of the dried polymer from decahydronaphthalene showed it to contain 17.1% soluble polymer. The average polypropylene particle size was under 0.5 micron and no clusters larger than 5 microns were present.

EXAMPLE 2

Preparation of colloidal dispersion of 98:2 propylene-ethylene copolymer

A nitrogen filled vessel was charged with 17.2 liters of n-heptane and 134 ml. (10 millimoles) of diethylaluminum chloride and the charge was heated to 50° C. with agitation. With the temperature constant at 50° C., 134 ml. of 0.52 millimolar titanium trichloride catalyst suspension in n-heptane, prepared as in Example 1 (except that reduction temperature was 2–3° C. and heat treatment at 150° C. for 1 hour) was added. Sixty (60) millimoles of octene-1 in the form of a 25% by volume heptane solution was then added in a single charge and the mass was held at about 50° C. for 60 minutes with agitation.

At the end of the 60 minutes, the nitrogen in the reactor was vented to the atmosphere and the reactor head space was flushed with propylene gas for 15 minutes. With the temperature maintained at 50° C., the vent was closed and the propylene pressure was allowed to build up to 60 p.s.i.g. and was then continued at a rate of 1030 g. per hour. After 18 minutes, ethylene gas was added to the feed gas in the amount of 2 mole percent based on the propylene gas and the reaction was allowed to continue to a total reaction time of 251 minutes. At this point, 3.9% by volume of n-butanol was added and the mixture was agitated for 16 hours at 50° C., followed by agitation for 3 hours with 4% aqueous hydrochloric acid, then washed neutral with distilled water.

The colloidal dispersion thus obtained contained 23.4% of a copolymer containing about 2 weight percent of ethylene. The copolymer had an intrinsic viscosity of 10.0, was 89.2% crystallizable. The average size of the primary particles was about 0.3 micron.

EXAMPLE 3

Preparation of colloidal dispersion of polypropylene in paraffin wax

A titanium trichloride catalyst was prepared in n-heptane by the reduction of titanium tetrachloride at 6° C. with diethylaluminum sesquichloride at a 1.5 molar ratio of aluminum to titanium, then heat-treated at 130° C. for 5 hours, washed with fresh n-heptane and again heat-treated at 130° C. for 6 hours.

To 160 ml. of molten paraffin wax (melting point of about 65° C.) which had been stirred for 4 hours with silica gel and then sparged with nitrogen, was added 2 millimoles of diethylaluminum chloride, 1 millimole of the above titanium trichloride-containing catalyst, and with the temperature at 60° C., 15 millimoles of octene-1 was added. The reaction mixture was stirred for 1 hour at 60° C. and then, with the temperature lowered to 57° C. (mixture still fluid), propylene was slowly added up to a pressure of 10 p.s.i. and vented. This pressuring and venting was repeated two more times, after which the propylene pressure was allowed to rise during 0.5 hour to 30 p.s.i. and maintained there during the polymerization. After 3 hours polymerization, the viscosity of the mixture started to increase and the reaction was shortstopped by adding 5 ml. of butanol. The temperature was raised to 60° C. and held there for 4 hours. The reaction mixture was then washed four times with hot (60° C.) water to remove the catalyst residues and the product was cooled to room temperature. Analysis showed the polyphase composition to contain 5.4% polypropylene.

A film of this blend was cast on metal foil at 60° C., then was fused at about 150° C. and finally was quenched in ice water. The film was stripped off the foil to yield a tough free film which could be oriented on stretching.

The following examples illustrate the preparation of the polyphase compositions of this invention and their use. All parts and percentages are by weight unless otherwise indicated.

EXAMPLE 4

To 50 parts of the colloidal polypropylene dispersion in heptane property in Example 1 was added 0.5% of a phenolic antioxidant and 0.25% of distearylthiodipropionate based on the weight of polypropylene. There was then added 85 parts of a paraffin wax having a melting point of 40–55° C. The mixture was heated in a water bath to 55° C. in a rotating vacuum flask and the pressure was reduced to 1 millimeter of mercury at 55–60° C. to remove the volatile solvent. A film of this blend was cast, fused 5 minutes at 150° C., then quenched in cold water. This film was biaxially oriented at 30–40° C. at a draw ratio of about 2 to 3× in each direction. The film so obtained had a thickness of 0.6 mil and had a modulus of 70,000 p.s.i., a tensile strength of 2100 p.s.i. and an ultimate elongation of 70%.

EXAMPLES 5–7

In Examples 5, 6 and 7, to a portion of the wax-polypropylene blend prepared in Example 4 was added varying amounts of a 50% solution of the glycerol ester of hydrogenated rosin in paraffin wax. In Example 7, there was additionally added a microcrystalline wax having a melting point of 77° C. The percentage composition of each of these blends is tabulated below.

| Example | 5 | 6 | 7 |
|---|---|---|---|
| Polypropylene | 16.5 | 11.5 | 10.3 |
| Paraffin wax | 67.0 | 77.0 | 69.1 |
| Rosin ester | 16.5 | 11.5 | 10.3 |
| Microcrystalline wax | | | 10.3 |

Films of each of these compositions were cast at 60° C., fused for 5–7 minutes at 145–150° C. and then were quenched in cold water. In each case, a flexible film was obtained which had an extensibility greater than 100%.

EXAMPLE 8

A 43% dispersion of titanium dioxide in toluene was prepared by adding 2.15% of a maleic anhydride-modified amorphous polypropylene, 0.5% of a phenolic antioxidant and 0.25% of lauryl thiodipropionate and the mixture was ground in a porcelain ball mill for 20 hours. To 100 parts of a colloidal dispersion of crystalline polypropylene having an intrinsic viscosity of 10.7 in n-heptane, prepared as described above, the dispersion having a solids content of 33.6% and 19.4% decahydronaphthalene solubles, was slowly added, with stirring, 103.5 parts of the titanium dioxide dispersion, and then was added 100.8 parts of paraffin wax. The mixture was heated as described in Example 4 to 55° C. to strip off the toluene and heptane. An additional amount of wax, 48 parts, was then added, followed by 1 part of an alkylated aromatic petroleum hydrocarbon (boiling range 185–213° C.) per 5 parts of the dispersion to reduce its viscosity. A film of this blend was cast, fused at 150° C. and quenched, whereby a very tough film was obtained.

EXAMPLE 9

To 71 parts of molten (90° C.) refined paraffin wax having a melting point of 50° C. was added 5 parts of a colloidal polypropylene having an intrinsic viscosity of 10.2 (as a 6.8% dispersion in xylene), 8 parts of a microcrystalline wax, 15 parts of a commercial styrene copolymer resin sold under the trade name of Piccotex 100 by Pennsylvania Industrial Chemical Corp. and 1 part of an ethylene-vinyl acetate copolymer (Elvax 310 sold by Du Pont). A 5-mil film of the molten mixture was cast, then fused for 30 seconds at 175° C., and finally was quenched in 0–2° C. water. The film stretched at a rate of 1 inch per minute, had an elongation of 100% and was uniaxially oriented.

EXAMPLE 10

The wax polymer blend prepared in Example 4 was heated to remove the volatile solvents. The blend was melted at 60° C. and strips of a non-woven mat, prepared from polyethylene terephthalate fibers and weighing 0.105 g. per square inch, were dipped in the wax blend and then were sandwiched between tin plate panels and baked for 5 minutes at 160° C., while compressed by three preheated 1-lb. weights. One of the samples was quenched in cold tap water and was found to be strong, with good flexibility on bending. It weighed 0.88 g. per square inch, showing that the impregnated mats contained 88.1% of the wax-polymer blend. A second sample of the impregnated mat was slowly cooled in air after dipping and again was found to be strong and fairly flexible, but showed a tendency to crack on bending.

EXAMPLE 11

The colloidal polypropylene dispersion used in this example was in n-heptane, had a total solids content of 20.4%, and had clusters of the polypropylene particles no greater than about 3 microns. The intrinsic viscosity of the polypropylene was 10.7 and the decahydronaphthalene soluble polymer in the dispersion was 7.2%. A wax-polypropylene blend was prepared as described in Example 5, the final composition containing 15% of the colloidal polypropylene, 77% of a refined paraffin wax having a melting point of 68° C. and 8% of a microcrystalline wax having an ASTM D–127 melt point of 77° C. This composition was coated by machine at a through-put rate of 50 ft./min. on one side only at the rate of 15 lbs. per ream add-on, on a 25 lbs. per ream super-calendered bleached sulfite paper by 85° C. fountain roll, then fused by a 190° C. hot roll and then was quenched by a 15° C. cold roll.

The following water vapor transmission rates, in grams per 100 square inches per 24 hours, were measured on the above coated paper and compared with those obtained on paper having a coating of paraffin and uncoated paper using TAPPI test procedures T-464 and T-465. The paraffin add-on in the control samples was the same as in the above example. The water vapor transmission rates were:

| | Flat | Creased |
|---|---|---|
| Example 11 | 0.2 | 0.4 |
| Control, paraffin only | 0.2 | 23 |
| Control, uncoated paper | >100 | >100 |

A coated face-to-face heat-seal bond was made from two pieces of the coated paper prepared in this example and it exhibited such strength as to resist rupture by peeling except by paper tear.

EXAMPLE 12

The colloidal dispersion used in this example was in n-heptane and had a total solids of 24.2%. The intrinsic viscosity of the polypropylene was 21.2 and there were no clusters greater than 2 microns in size. A composition was prepared as described in Example 11 containing 10% of the colloidal polypropylene, 63% of the refined paraffin wax (melting point of 68° C.), 7% of the microcrystalline wax, and 20% of the glycerol ester of hydrogenated rosin having a softening point of 85° C. This composition was used to coat the paper exactly as described in Example 11. The burst strength in pounds per square inch was measured using ASTM test procedure D–774 and was found to be 28, in contrast to 19 for paper coated with paraffin only and 19 for uncoated paper.

EXAMPLE 13

A wax-polypropylene blend containing 85% refined paraffin wax (melting point of 68° C.) and 15% polypropylene was prepared as described in Example 4, using for the preparation a polypropylene colloidal dispersion in heptane having a total solids content of 21.6% with no clusters of the particulate polypropylene greater than 3 microns. The intrinsic viscosity of the polypropylene was 11.4. Measurements were made of the melt viscosity at selected temperatures to demonstrate the fluidity at low elevated temperatures, which gives ease of application, the stability of the wax dispersion blend at various lengths of time at a given temperature showing that premature fusion does not take place, and finally demonstrating the hyper viscosity at fusion temperatures, showing that the final fused mix has a polymer-like performance capability. The viscosity is given in centipoises, measured at 80°, 90° and 100° C. by a Brookfield model LVF, rotor 4, 6 r.p.m. and at 160°, 170° and 180° C. by HAF, rotor 7, 5 r.p.m.

|  | Hours at temperature | | |
|---|---|---|---|
|  | 1 | 8 | 120 |
|  | Viscosity in centipoises | | |
| 80° C | 245 | 250 | 260 |
| 90° C | 270 | 280 | 285 |
| 100° C | 320 | 575 | 1,210 |
| 160° C | 2,976,000 | | |
| 170° C | 2,616,000 | | |
| 180° C | 1,720,000 | | |

The 25° C. density of the original (unfused) blend was 0.9193 g. per cubic centimeter and that of the fused blend was 0.9178 g. per cubic centimeter.

EXAMPLE 14

A series of dispersions of colloidal polypropylene of different intrinsic viscosities and varying concentrations in a refined paraffin wax (melting point 68° C.) was prepared to demonstrate the effect of polypropylene concentration at different molecular weight on the polyphase composition obtained.

Appropriate quantities of wax were dissolved into heptane dispersions of the colloidal polypropylenes, stabilized with 0.5% of a phenolic antioxidant and 0.25% of lauryl thiodipropionate, and the heptane was removed under vacuum while heating at 80° C. Additional molten wax was added at 80–95° C. as needed to give the desired concentration and the mixture was sheared under vacuum to assure good mixing and removal of air bubbles. Microscopic examination of these sheared dispersions showed them to be free of flocculates of polymer and free of air bubbles.

Films (about 12 mils) of each of these dispersions were cast onto preheated (85–95° C.) ferrochrome panels with a preheated 20-mil casting knife and then quenched in ice water. The ferrochrome panel with its 12-mil coating was placed between two 3-mil thick aluminum cover sheets. Between the top cover sheet and the film surface was placed a 3-mil thick aluminum picture frame mold. The assembly was then placed between platens of a preheated electrically heated press and pressed under low pressure (500 to 1000 p.s.i) for 30 seconds at 177° C. to fuse the polypropylene-wax compositions. The films were then quenched by immersing the ferrochrome substrates plus aluminum cover sheets in a 0° C. water bath, after which the film was removed from the substrate and tested for its elongato-ability. The results are tabulated below and shown graphically in FIG. 1.

|  | I.V. | Percent conc. | Percent elongation |
|---|---|---|---|
| A(1) | 12.2 | 13.8 | 540 |
| A(2) |  | 5.0 | 40 |
| B(1) | 11.0 | 18.5 | 570 |
| B(2) |  | 13.8 | 450 |
| B(3) |  | 10.0 | 40 |
| B(4) |  | 7.0 | 10 |
| B(5) |  | 5.0 | 5 |
| C(1) | 8.1 | 19.5 | 590 |
| C(2) |  | 13.8 | 340 |
| C(3) |  | 11.0 | 7 |
| C(4) |  | 5.5 | (¹) |
| D(1) | 7.5 | 20.0 | 540 |
| D(2) |  | 17.0 | 510 |
| D(3) |  | 10.0 | 2 |

¹ Too brittle to test.

EXAMPLE 15

A series of polypropylene-paraffin wax composites were prepared to demonstrate the effect of the quench rate on the polyphase composition obtained.

The paraffin wax used was a household grade wax having a melting point of 50° C. The polypropylene used was a colloidal dispersion in n-heptane of a polypropylene having an intrinsic viscosity of 8.1. Films were prepared by the same procedure described in Example 14, one set being quenched in 0° C. water bath (quench rate of 250° C./min.), a second set quenched in a 50° C. water bath (quench rate of 110° C./min.) and the third set being annealed by allowing them to cool in air. The elongation for each of these series is tabulated below:

|  |  | Percent concentration polypropylene | Percent elongation |
|---|---|---|---|
| A(1) | 0° C. quench | 20 | 630 |
| A(2) |  | 12 | 560 |
| A(3) |  | 8.5 | 13 |
| B(1) | 50° C. quench | 20 | 30 |
| B(2) |  | 12 | 20 |
| B(3) |  | 8.5 | <1 |
| C(1) | Air-cooled | 20 | 13 |
| C(2) |  | 12 | <1 |
| C(3) |  | 8.5 | (¹) |

¹ Too brittle to test.

These results are shown graphically in FIG. 2.

EXAMPLE 16

The films prepared in Example 14, Numbers B(1) to (3), C(1) and (2), and in Example 15, Number A(1) were biaxially oriented by stretching at 65–70° C. to 3.5 x 3.5 in a T. M. Long stretcher. The final film thickness in each case was 0.5–1 mil. The physical properties of each of these films before and after biaxial orientation are tabulated below.

|  | Polypropylene | | Before orientation | | After orientation | | |
|---|---|---|---|---|---|---|---|
| Example | I.V. | Percent conc. | Tensile, p.s.i. | Percent elongation | Tensile, p.s.i. | Percent elongation | Modulus, p.s.i. |
| 14 B(1) | 11 | 18.5 | 1,040 | 570 | 3,200 | 170 | 76,000 |
| 14 B(2) |  | 13.8 | 770 | 450 | 2,600 | 120 | 100,000 |
| 14 B(3) |  | 10 | 670 | 40 | 2,300 | 110 | 110,000 |
| 14 C(1) | 8.1 | 19.5 | 1,170 | 590 | 3,600 | 130 |  |
| 14 C(2) |  | 13.8 | 640 | 340 | 3,000 | 120 | 120,000 |
| 15 A(1) | 8.1 | 20 | 940 | 630 | 3,100 | 157 | 13,400 |

EXAMPLES 17 and 18

Films were prepared following the procedure described in Example 14 from (in Example 17) the colloidal dispersion of the 98.2 propylene:ethylene copolymer prepared in Example 2 and in Example 18 from a colloidal dispersion of a propylene-1-butene copolymer containing 11.3 weight percent 1-butene and having an intrinsic viscosity of 8.8, and a fully refined paraffin wax (melting point 68° C.). The compositions contained 20 weight percent of the copolymer in each case. The films in Example 17 were fused at 177° C. for 30 seconds and quenched in water at 0° C., 25° C. and 50° C. and in Example 18 at 0° C. only.

| Example | Quench temperature, °C. | Tensile strength, p.s.i. | Percent elongation |
|---|---|---|---|
| 17 | 0 | 1,060 | 460 |
|    | 25 | 910 | 370 |
|    | 50 | 910 | 340 |
| 18 | 0 | 1,000 | 550 |

EXAMPLE 19

A film (3-mil thick) was prepared by the procedure described in Example 14 from an 85% by weight paraffin wax (melting point 68° C.) and 15% by weight of colloidal polypropylene (I.V. of 7.5). A ribbon cut from this film and ¼ inch wide was stretched 600% (150% elongation) and then was twisted to produce a strong fiber which had a tensile strength of 3000 p.s.i. and a modulus of 120,000 p.s.i.

What we claim and desire to protect by Letters Patent is:

1. A solid polyphase composition comprising:
   (a) a crystallizable propylene polymer present as a substantially continuous network phase in the crystalline but essentially non-spherulitic state and having an intrinsic viscosity of at least about 7.5; and
   (b) a second phase uniformly distributed throughout said polymer comprising a hydrocarbon wax; said propylene polymer containing at least 75 mole percent of propylene and constituting at least about 5% and less than about 20% of the total polyphase composition.

2. The composition of claim 1 wherein the propylene polymer is present as a substantially continuous network in the smectic and essentially non-spherulitic state.

3. An unsupported film of the composition of claim 1.
4. An oriented film of the composition of claim 1.
5. A fiber of the composition of claim 1.
6. An oriented fiber of the composition of claim 1.
7. A substrate coated with the composition of claim 1.
8. The composition of claim 1 wherein the propylene polymer is polypropylene.

References Cited
UNITED STATES PATENTS

| | | | |
|---|---|---|---|
| 3,376,244 | 4/1968 | Rundle | 260—28.5 A |
| 3,503,914 | 3/1970 | Tyran | 260—28.5 AV |
| 3,220,966 | 11/1965 | Flanagan | 260—28.5 A |
| 3,536,645 | 10/1970 | Miller | 260—28.5 A |
| 3,560,604 | 2/1971 | Papps | 264—210 F |
| 3,554,950 | 1/1971 | Sauer | 260—28.5 A |
| 3,418,304 | 12/1968 | Langer | 260—93.7 |
| 3,030,322 | 4/1962 | Schrader | 260—28.5 A |

MORRIS LIEBMAN, Primary Examiner

P. R. MICHL, Assistant Examiner